J. L. MACKEY.
CAR DOOR.
APPLICATION FILED MAR. 19, 1920.

1,347,283.

Patented July 20, 1920.
2 SHEETS—SHEET 1.

Inventor
J. L. Mackey.
By D. Swift
Attorney

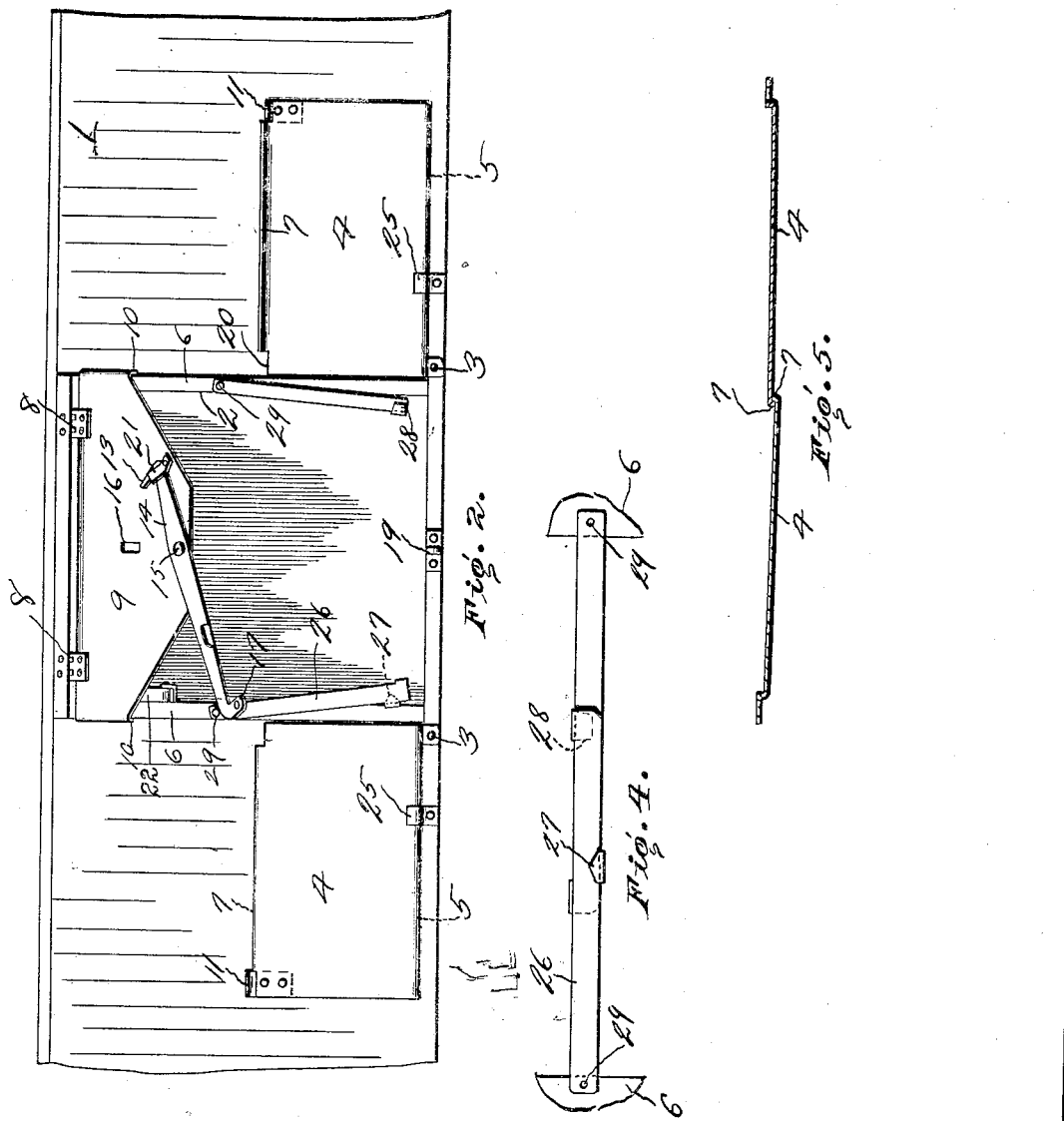

UNITED STATES PATENT OFFICE.

JOSEPH L. MACKEY, OF FOWLER, ILLINOIS.

CAR-DOOR.

1,347,283. Specification of Letters Patent. Patented July 20, 1920.

Application filed March 19, 1920. Serial No. 367,041.

*To all whom it may concern:*

Be it known that I, JOSEPH L. MACKEY, a citizen of the United States, residing at Fowler, in the county of Adams, State of Illinois, have invented a new and useful Car-Door; and I do hereby declare the following to be a full, clear, and exact description of the invention, such as will enable others skilled in the art to which it appertains to make and use the same.

The invention relates to car doors and has for its object to provide a car door comprising a pair of pivoted doors, which doors are pivoted at their lower outer corners to the side of the door adjacent the lower outer corners of the door opening so that said doors may be swung from each other at their upper ends and held in brackets thereby allowing access to the car. Also to provide a horizontally hinged section hinged to the upper edge of the door opening and adapted to swing downwardly over the upper ends of the pivoted door sections and receive registering lugs having apertures therein through an aperture in the horizontally pivoted section through the apertures of which registering lugs, one end of a pivoted locking lever is received, the other end of said locking lever being received in an aperture of a lug located adjacent the lower edge of the door opening.

A further object is to provide the vertical edges of the pivoted door sections with flanges adapted to engage the outer vertical flanges edges of the door frame for holding the door sections against displacement. Also to provide the adjacent edges of the pivoted door sections with flanges which overlie each other when the pivoted door sections are in closed position.

With the above and other objects in view the invention resides in the combination and arrangement of parts as hereinafter set forth, shown in the drawings, described and claimed; it being understood that changes in the precise embodiment of the invention may be made within the scope of what is claimed without departing from the spirit of the invention.

In the drawings:—

Fig. 2 is a view similar to Fig. 1 but showing the door in open position.

Fig. 4 is a detail view of a brace which extends transversely of the door opening for holding the door sections against being forced inwardly centrally of the door as a whole.

Fig. 5 is a transverse sectional view through the pivoted door section, showing their flanged vertical edges.

Figure 1:
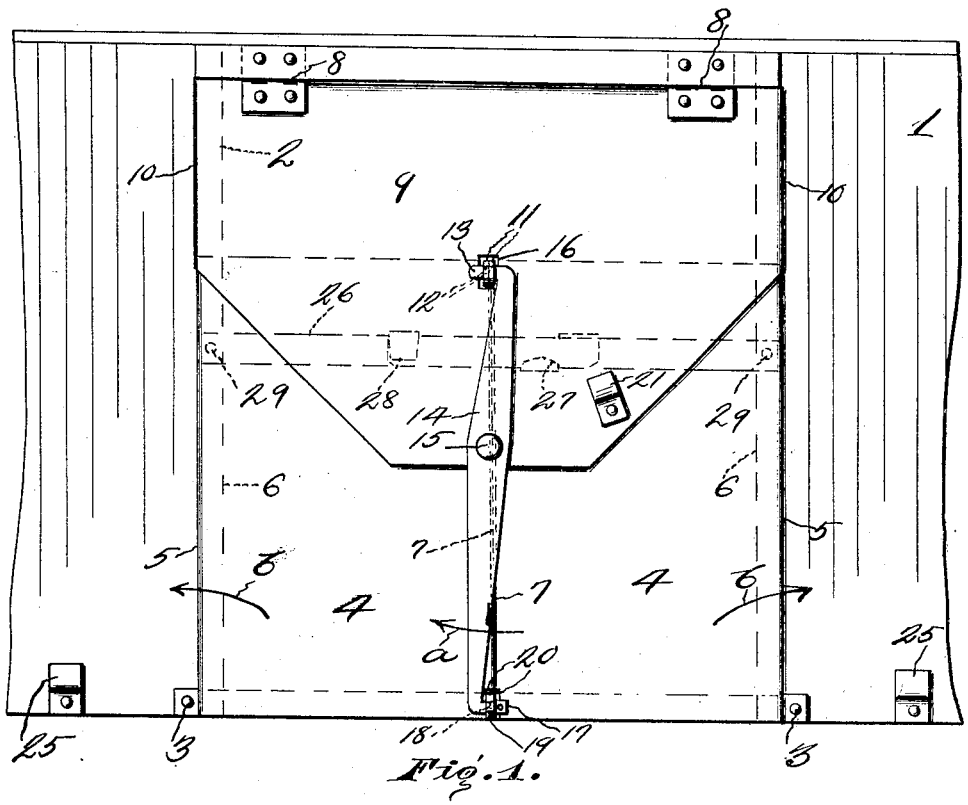
Figure 1 is a side elevation of a portion of a car showing the door applied to the door opening thereof.

Referring to the drawings, the numeral 1 designates a conventional form of freight car and 2 the door opening therein. Pivoted to the outer face of the car as at 3 adjacent the outer lower corners of the door opening 2 are door sections 4. Each section 4 is provided with vertical flanges 5, which engage the outer edges of the vertical sides 6 of the door frame for limiting the inward movement of the door sections 4. The adjacent edges of the pivoted door sections 4 are provided with flanges 7, which flanges when the door is in closed position overlap each other as shown in Fig. 5, thereby preventing entrance of water and also forming interlocking means when the door is locked. Hingedly connected as at 8 to the upper marginal edge of the door opening 2 is a horizontally pivoted door section 9, the lower end of which section overlies the upper ends of the door sections 4 when said door sections 4 are in closed positions. The vertical edges of the horizontally pivoted door section 9 is provided with flanges 10, which engage the outer sides of the side rail 6 of the frame of the door when said section 9 is in closed position as shown in Fig. 1.

The door sections 4 at their upper adjacent corners are provided with lugs 11, which lugs are provided with registering apertures 12 for the reception of the lug 13 of the pivoted lever 14, which lever is pivoted as at 15 to the horizontally pivoted door section 9. When the lug 13 is in engagement with the apertures 12 and the lugs 11 are extending through the aperture 16 of the door section 9, the door sections 4 and 9 will be securely locked together. The pivoted lever has its other arm provided with a lug 17 which, when the lever is in locked position engages an aperture 18 in the lug 19 carried adjacent the lower side of the door opening 2. Lug 19 extends outwardly through notches 20 in the lower inner corners of the door sections 4 so that the lug 17 which is carried by the lever 14 when forced through the aperture of the lug 19 will extend across said recesses and securely lock the lower edges of the door sections 4 against outward displacement.

Figure 3:
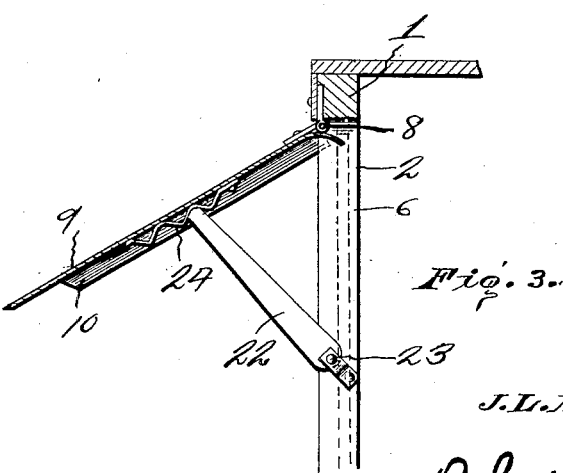
Fig. 3 is a detail sectional view through a portion of the car and door opening showing the horizontally pivoted section held outwardly by a pivoted brace.

When it is desired to open the door the lever 14 is moved in the direction of the arrow $a$ so as to move the lugs 13 and 17 out of engagement with the apertures and lugs 11 and 19. The pivotal movement of the lever 14 being limited by coming into engagement with a stop 21. The horizontally pivoted section 9 is then swung upwardly to the position shown in Fig. 3, at which time a pivoted brace 22 which is pivoted as at 23 to the side of the door frame is moved upwardly at its free end until it engages one of the corrugations in the bracket 24 carried on the inner face of the pivoted section 9. Then the sections 4 are pivotally swung outwardly in the direction of the arrows $b$ until they are received and supported in the brackets 25 carried by the sides of the car as shown in Fig. 2, at which time access may be had to the interior of the car. The door sections are made of sheet metal and therefore to prevent the same from springing inwardly and additionally brace the same a horizontally disposed brace 26 is provided. The brace 26 comprises two sections formed from flexible metal so that the overlapping lugs 27 and 28 may be placed in engagement with the marginal edges of each section. Each section of the brace 26 is pivoted as at 29 to the side rails 6 of the door frame.

From the above it will be seen that a car door is provided which may be easily and quickly opened and closed and one wherein the jamming of the doors will be impossible for the reason that the section 9 swings outwardly and there is sufficient outward play and springing of the pivoted door sections 4 so that the flanges 7 may be moved out of interlocked position and the sections 4 moved to the positions shown in Fig. 2.

The invention having been set forth what is claimed as new and useful is:—

1. A car door comprising a pair of door sections rectangular shaped, the outer lower corners of said rectangular shaped door sections being pivoted to the side of the car adjacent the lower outer corners of the door opening, means for supporting said door sections when they are in open position, a horizontally hinged door section hinged to the upper edge of the door opening, an aperture in said horizontally hinged door section, said aperture being adapted to receive lugs carried by the first mentioned door sections when said sections are in closed positions, a lever pivoted to the horizontally hinged door section and having arms for entering apertures in the lugs carried by the door sections and in a lug adjacent the door opening, said pivoted door sections being provided with flanges for engaging the outer edges of the door frame and for overlapping each other at their engaging edges and flanges carried by the horizontally hinged door sections for engaging the sides of the door sections.

2. The combination with a car door opening, of a door therefor comprising a pair of rectangular shaped door sections, said door sections being pivoted at their lower outer corners to the side of the car adjacent the lower outer corners of the door opening, a horizontally hinged door section hinged to the upper edge of the door opening, said door section having an aperture therein, said aperture being adapted to receive engaging apertured lugs carried by the pivoted door sections and a pivoted lever pivoted to the horizontally hinged door section and provided with a lug adapted to engage the apertures lugs carried by the pivoted door sections for holding the door as a whole in a closed position.

In testimony whereof I have signed my name to this specification in the presence of two subscribing witnesses.

JOSEPH L. MACKEY.

Witnesses:
ANDREW C. SELMACK,
PAUL P. SCHELL.